United States Patent Office.

JEAN LAMBERT, JR., OF NEW YORK, N. Y., ASSIGNOR TO HIMSELF AND CHARLES RUMPFF, OF SAME PLACE.

*Letters Patent No. 82,129, dated September 15, 1868.*

IMPROVED ANILINE-DYE.

*The Schedule referred to in these Letters Patent and making part of the same.*

TO ALL WHOM IT MAY CONCERN:

Be it known that I, JEAN LAMBERT, Jr., of New York, in the county and State of New York, have invented a new and useful Improvement in Aniline-Colors; and I do hereby declare the following to be a full, clear, and exact description thereof, which will enable those skilled in the art to make and use the same.

This invention consists in a new color, or a new red-coloring material, which produces on silk, wool, cotton, and other fabrics or articles, without the aid of acids or mordants, a shade of carmine, and which has this advantage over the safflower, that it can be printed on silk, cotton, and wool.

This new coloring-material, which I call "saffranine," is obtained by me by means of an oxide, of purple color, called "harmaline," "marweine," or "Perkins violet," which latter is obtained by the action of bichromate of potash, chloride of lime, or permanganate of potash, or their equivalents, when in a solution upon a salt of aniline; such, for example, as a sulphate, chlorohydrate, acetate, or any other equivalent salt.

My process for obtaining the said new coloring-material, saffranine, is as follows, using about the following proportions of the several substances mentioned, to wit:

I take one part, by weight, of violet-harmaline paste, and dissolve the same in two parts of ordinary acetic acid, of 8° of Baume, and one hundred parts of water. I subject the solution to heat, and when it is boiling I add one part of binoxide of lead, and keep it boiling for about an hour and a half, and then neutralize the acetic acid by plenty of caustic soda.

That portion of the violet which is not transformed into red, precipitates, because it will not dissolve in alkaline water, but the red remains dissolved, and I next separate the one from the other by filtration, the violet remaining in the filter. This residuum violet which remains in the filter will still give my new coloring-product, saffranine-red, if again subjected to oxidation.

The saffranine-red solution is next boiled with a little pulverized carbonate of lime, in order to remove any remainder of violet therefrom, and the red liquid is then ready to be used in coloring silk, wool, or cotton.

I can obtain the carmine-color by adding to the saffranine-red solution the chlorides either of sodium, calcium, tin, mercury, tannic or picric acid.

In the transformation of violet harmaline into red, the acetic acid may be replaced by either sulphuric acid, oxalic acid, or any other acid which is capable of decomposing the binoxide of lead.

On the other hand, the binoxide of lead may be replaced by the permanganate of potash, binoxide of mercury, or oxygenated water.

My new product of coloring-material, called by me saffranine-red, possesses the following characteristics: It can be dissolved in hot water, alchohol, acetic acid, and other solvents, becomes a bluish-red by the addition of concentrated sulphuric or hydrochloric acids, and remains a fast color even when exposed to the action of concentrated acids or alkalies, such as potash, soda, or spirits of hartshorn, (ammonia.)

Having thus described my invention, what I claim as new, and desire to secure by Letters Patent, is—

1. The new product or coloring-material above described, called by me saffranine-red.

2. I also claim the process employed by me for producing the said coloring-material, saffranine-red, substantially as above described.

This specification signed by me, this 8th day of August, 1868.

J. LAMBERT, JR.

Witnesses:
   D. B. CHILDS,
   J. VAN SANTVOORD.